T. B. DORNIN.
HIGH PRESSURE PLUG COCK.
APPLICATION FILED MAR. 8, 1913.
1,099,592.
Patented June 9, 1914.
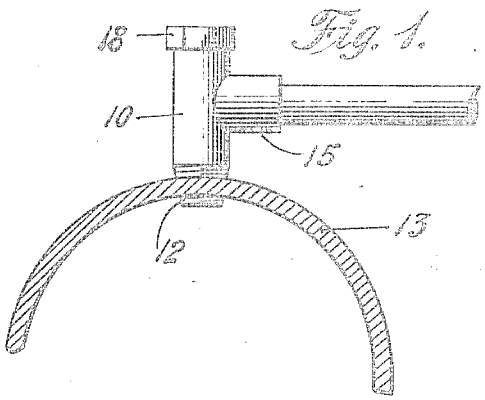
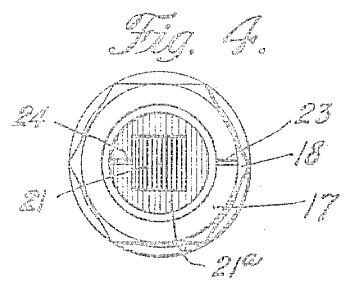
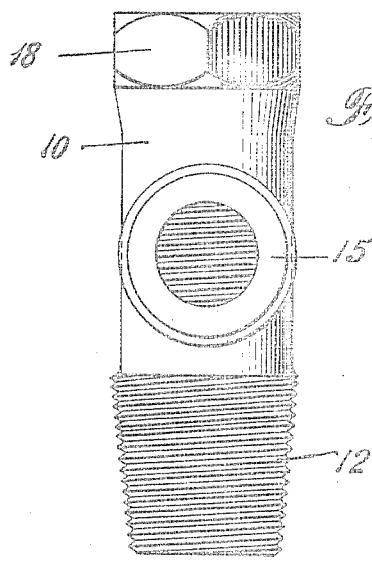
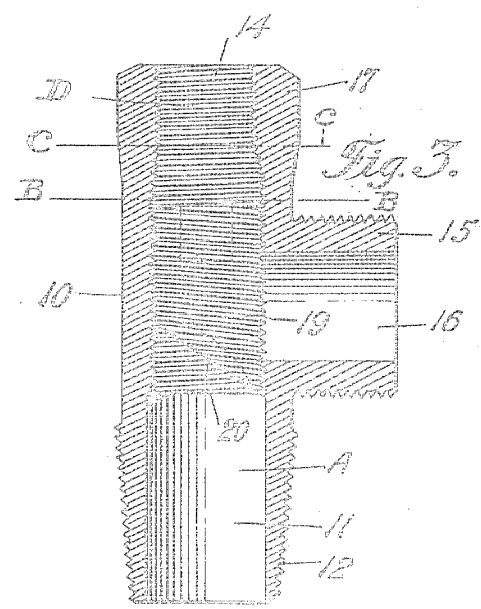
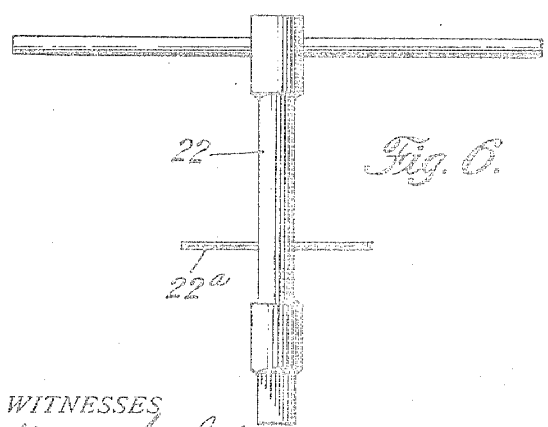
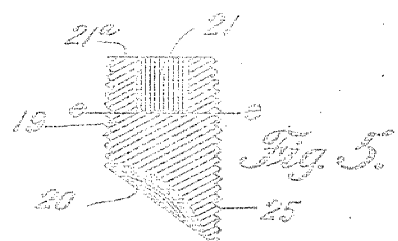
WITNESSES
INVENTOR
Thomas B. Dornin
By Attorneys

UNITED STATES PATENT OFFICE.

THOMAS BERNARD DORNIN, OF NORFOLK, VIRGINIA, ASSIGNOR TO THE H. MUELLER MANUFACTURING COMPANY, OF DECATUR, ILLINOIS, A CORPORATION OF ILLINOIS.

HIGH-PRESSURE PLUG-COCK.

1,099,592.    Specification of Letters Patent.    Patented June 9, 1914.

Application filed March 8, 1913. Serial No. 753,035.

*To all whom it may concern:*

Be it known that I, THOMAS B. DORNIN, a citizen of the United States, residing at Norfolk, in the county of Norfolk and State of Virginia, have invented certain new and useful Improvements in High-Pressure Plug-Cocks; and I do hereby declare the following to be a full, clear, and exact description of the invention, such as will enable others skilled in the art to which it appertains to make and use the same.

This invention is a high pressure plug cock designed more particularly for service in connection with water, gas, or other fluid mains, although the device is equally applicable to any service which requires a side outlet cock, capable of being opened and closed.

Corporation cocks for use in connection with mains carrying fluids under pressure are generally made of comparatively expensive material, and at considerable labor in their construction to insure tightness of the parts for preventing leakage of the fluid through the cock. One of the most satisfactory corporation cocks now in use, in addition to the cost of manufacture in material and labor, requires additional labor of the workmen in making connections to the branch pipe and the like, in the insertion of a bent union coupling.

A tapping machine is commonly employed in connection with a corporation cock to drill a hole into a main carrying fluid under pressure, thread the hole so bored, prevent the rush of water or gas from the main, and thereafter insert a cock into the threaded hole.

After a corporation cock has been once installed and opened, it usually remains open for its entire life, as it is customary to provide a suitable cutting-off cock in the branch pipe leading to a building. However, in the event of a break in the branch pipe between the corporation cock and the cut-off cock, it is necessary that the corporation cock be so constructed that it may cut off the flow of fluid from the main and thereby permit the making of necessary repairs. As such occurrences are rare, it is obvious that a fitting which will fulfil the requirements, which can be applied to mains or vessels containing fluid under pressure in a closed position, and which can be opened after the branch pipe has been run, which permits also of the flow of fluid being shut off when desired, will satisfactorily serve all purposes of the expensive devices now employed.

The corporation cocks with which I am familiar depend for their tightness upon a planed or ground joint between the body of the cock and the plug or key thereby requiring the device to be made of a high grade composition of metals and of considerable weight. These cocks are frequently made, also, with an outlet passage at the top, thereby requiring a bent union coupling to connect the cock with a branch pipe. The great number of parts of the cock, its expensive material, together with the manner of coupling entails considerable labor and expense upon a corporation and its patrons in the installation of service connections.

The main object of my invention, therefore, is to so simplify the construction and operation of my pressure plug cock that it can be made with less labor and less material than the types of corporation cocks now ordinarily employed. Moreover, the invention may be inserted by any of the usual type of tapping machines on the market, and requires no special construction of the parts of such machine.

Owing to the construction of the device, it can be made of less expensive material and at the same time render a service equal to, if not greater than, the corporation cocks now employed and with less labor to the operator. Furthermore, the construction of the valve eliminates the disadvantage of leaking joints.

A further object of the invention resides in the construction and arrangement of parts hereinafter described and specified in the appended claims, whereby the device may not only be readily applied to a main but renders the work of connecting the branch pipe less laborious.

One embodiment of the invention is illustrated in the accompanying drawings but the construction therein is to be understood as illustrative only and not as defining the limits of the invention.

Figure 1 is a side elevation showing the plug cock applied to a main. Fig. 2 is a plan view of the plug cock. Fig. 3 is a longitudinal sectional view on the line 3—3 of Fig. 2. Fig. 4 is an end view. Fig. 5 is a detailed sectional view through the plug valve. Fig. 6 is a side elevation of an operating tool to be used in connection with the operation of the valve.

In the embodiment of the invention illustrated in the accompanying drawings, I have shown the plug cock provided with a casing 10, the lower or inlet end 11 of which is provided with external threads 12 adapted to engage a threaded opening in a main indicated at 13. This inlet end of the cock is preferably tapered as shown in Fig. 3, as is usual with corporation cocks of this type. The casing is provided with an opening throughout its length extending from the inlet end 11 to the adjusting end 14 thereof, a portion of this opening being screw threaded, as indicated. The casing is provided, also, with an arm 15 having an opening 16 serving as the outlet opening to the cock. This opening 16 is at right angles to the lower opening through the casing. The arm 15 may be either externally or internally threaded to receive a service pipe to the building and thereby eliminate the ordinary bent union coupling now frequently employed. The casing, therefore, is provided with three openings, 11, 14 and 16. The end adjacent to the opening 14, which is designated at 17 may be interiorly or exteriorly screw threaded to facilitate its adjustment in the tapping machine. The outer surfaces thereof may be provided with a hexagonal portion 18 permitting the cock to be screwed tightly into the main by an ordinary wrench after the tapping machine has been removed. The main passage indicated at A through the cock is preferably not threaded at the lower portion of its inlet end 11. The portion of the main passage A which extends from a short distance below the opening 16 to the line B is cylindrical and its wall screw threaded, and the portion of this passage A from the line B up to the point indicated at C is taper screw threaded, the taper being a gradual one. The remaining portion of the passage indicated at D, may serve as a means of attaching the inserting plug of the tapping machine, or for an ordinary plug to close the end of the cock after insertion into a main and thereby prevent foreign matter from clogging the opening. Coöperating with this casing is a plug valve 19 shown more particularly in Figs. 3 and 5. This plug valve is employed in connection with a casing to open and close the cock. This valve 19 is shown provided with an inclined concave face 20 at one end thereof, while at its other end, it is provided with a recess 21 for receiving a suitable tool such as a wrench, shown in Fig. 6, whereby the plug may be moved to its various positions within the casing. This recess may be of any desired shape to conform to the operating tool employed and it may be interiorly screw threaded, if desired. This plug valve is shown exteriorly screw threaded for its entire length, the threaded top portion of which positioned between the line $e$—$e$ and the end $21^a$ thereof, being preferably tapered toward said end $21^a$, and designed to fit into and make a perfectly tight joint between the tapered screw threads situated between the lines B, C of the casing. The remainder of the threaded portion of the plug valve is preferably cylindrical and so designed as to make a reasonably tight working connection with the screw threads positioned between the line B and the end 11, of the casing. This plug valve is so designed that when it is moved by the operating tool 22 of Fig. 6, or any other suitable devices, toward the end 14 of the casing, said plug valve 19 will make a tight joint with the screw threads of the valve casing and at the same time permit a clear and unobstructed passage for fluid from the end 11 through the casing and out through the opening 16. The fluid will be guided in its passage by the concave face 20 of the plug.

To facilitate the adjustment of the plug valve by the workmen, a suitable indicating mark 23 may be provided on the casing, and a registering mark 24 on the plug valve may be employed so that when such marks 23, 24 are adjacent to each other, the operator will know that the inclined concave face 20 is in the proper position to obtain a clear passage through the casing from the inlet port 11 and out through the port 16. When it is desired to close the cock, the tool 22 may be operated to direct the plug valve 19 from the end 14 until the longitudinal side 25 of said valve completely closes the opening 16 thereof. The plug valve 19 is inserted through the end 11 until it engages with the screw threads of the channel of the casing, whereupon the plug may be turned and brought into operative position within the casing. The cock, therefore, comprises only two members, a casing and the plug 19 so that it precludes the disarrangement of many parts or adjustments which are so commonly necessary in cocks of this type.

In operation, a hole is drilled or tapped into a main or vessel in the usual manner by a tapping machine and the plug cock inserted by said machine through the means of the screw threads D. The cock would ordinarily be supplied to the users with the plug valve 19 closing the opening 16, as shown in Fig. 3. However, the valve is so simple that the operator can readily see with the eye whether its opening is completely closed and if not, can readily move the plug valve to its closed position. After the cock has been applied, the tapping machine can be removed from the main, and the cock can then be screwed tightly into position by an ordinary wrench engaging the polygonal head 18. The branch piping can now be connected to the end 15 of the casing in any desired manner. After this connection, the valve is opened by moving the member 19 toward the end 14 until the tapering screw threads thereof make a tight joint with the tapering threads of the casing and the indicating marks 23, 24 are brought into registration. The valve is then entirely opened and fluid may pass from the main out into the branch pipe to be supplied.

Having thus fully described my invention, what I claim as new and desire to secure by Letters Patent is:

1. A plug cock comprising a casing having three openings and a longitudinal passage way, the walls of the latter of which are screw threaded and tapered away from the inlet opening, and a plug valve removably mounted within the casing, said plug valve being provided with screw threaded tapered walls for coöperating with the screw threaded portion of the casing and an inclined face, whereby the turning of the plug on its axis for substantially 180°. will open or close the valve.

2. A plug cock comprising a casing having a longitudinal passage way and an outlet arranged radially to the passage way, the walls of said passage way being screw threaded and tapered away from the inlet opening, a plug valve removably mounted within the casing, said valve being provided with screw threaded walls for coöperating with the screw threaded portion of the casing and with an inclined and concave face, said plug valve operating to open or close the passage way through the outlet, the concave inclined face directing the flow of liquid from the longitudinal passage way to the outlet, when the plug valve is in one position, and cutting off communication between the passage way and outlet when the plug valve is turned on its axis for substantially 180 degrees.

3. A plug cock comprising a casing having a longitudinal passage way, said passage way providing an inlet for fluid and an adjusting opening for the casing, an outlet port connecting with said passage way at an angle thereto, and a plug valve positioned within the casing and provided with an inclined face and means for moving said plug to open and close the outlet port, the walls of said passage way and plug being tapered toward the adjusting opening, whereby when the plug valve is moved to its opened position, the fluid passing through the cock will be prevented from escaping through the adjusting opening.

4. A plug cock comprising a casing having a longitudinal passage way and an arm having an opening at right angles to the casing, one end of said casing being tapered and screw threaded, the other end of the casing being provided with an external polygonal surface, means on the arm for connecting the cock with a conductor, and a plug valve mounted for rotary movement within said passage way, one end of said plug valve being substantially at right angles to the walls thereof, while the other end of the plug valve is dished and inclined with relation to said walls.

In testimony whereof, I affix my signature, in presence of two witnesses.

THOMAS BERNARD DORNIN.

Witnesses:
WALTER E. BLICK,
STANTON CLARKE.